Jan. 23, 1968  R. H. BISBING  3,365,223
BUTT JOINT DRAW FASTENER
Filed Oct. 7, 1965  3 Sheets-Sheet 1
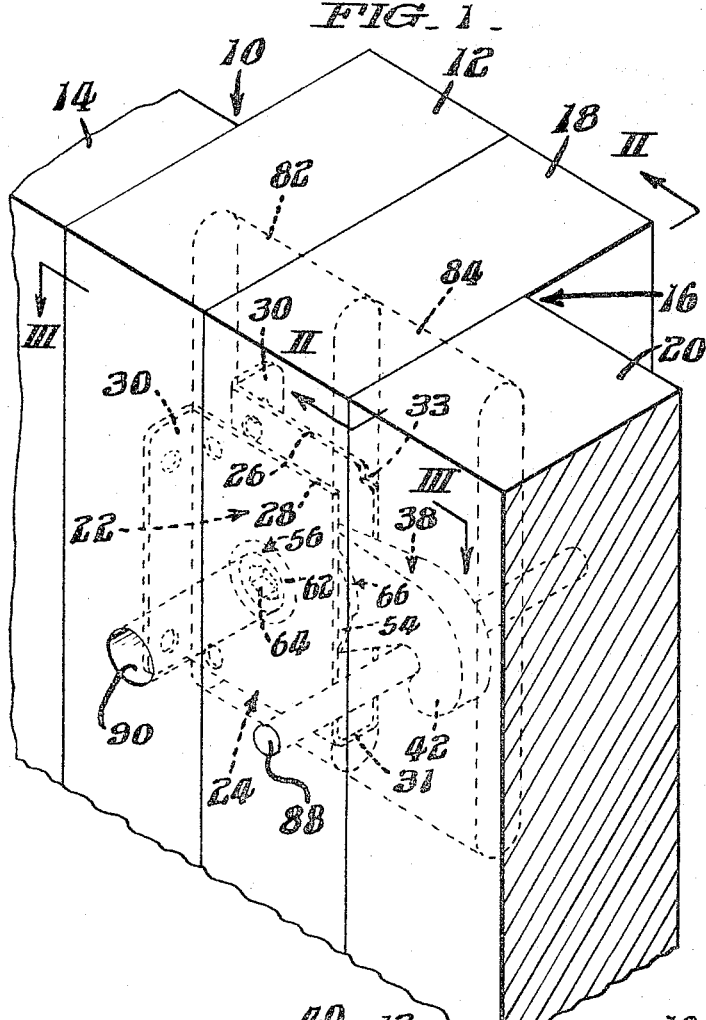
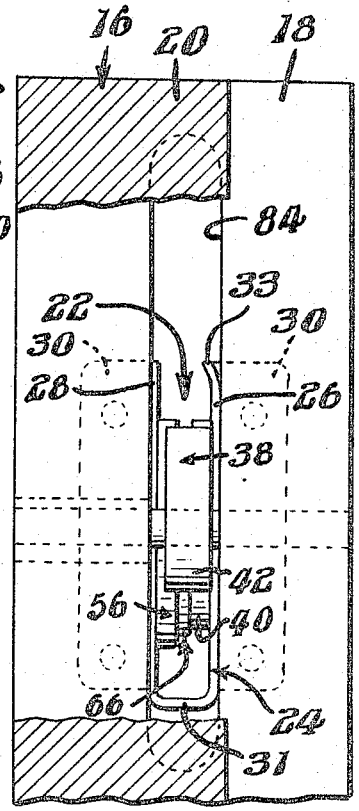
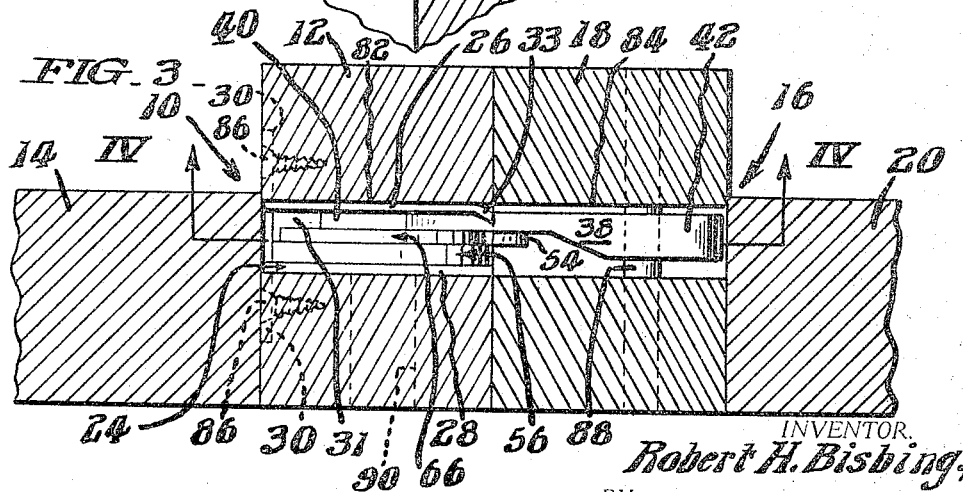
INVENTOR.
Robert H. Bisbing,
BY
Paul & Paul
ATTORNEYS.

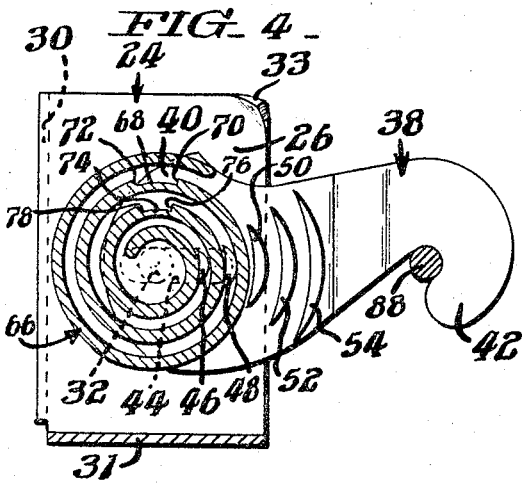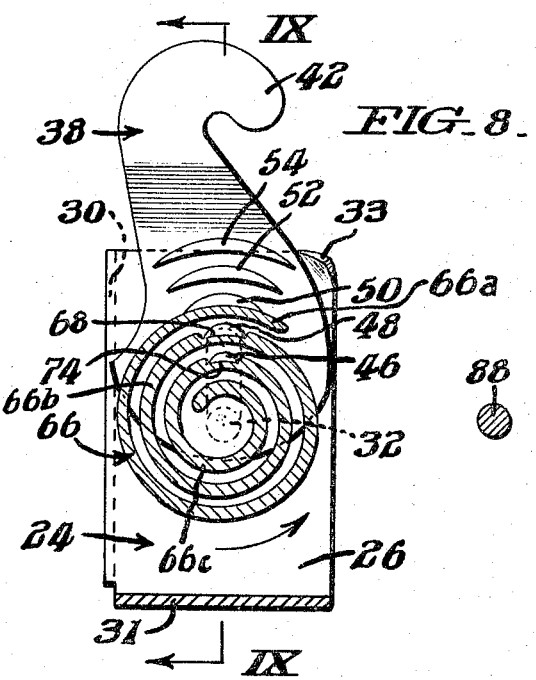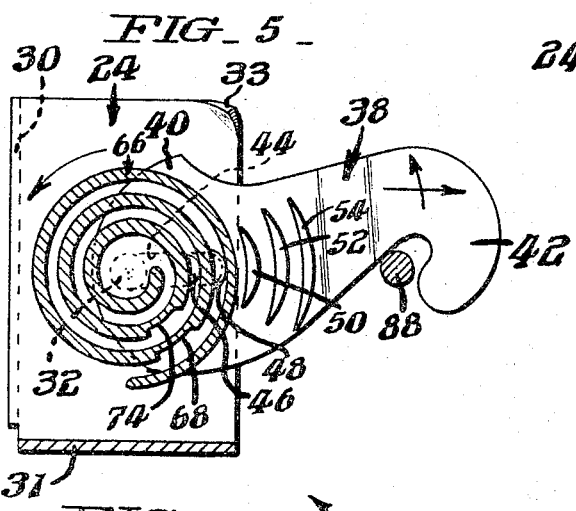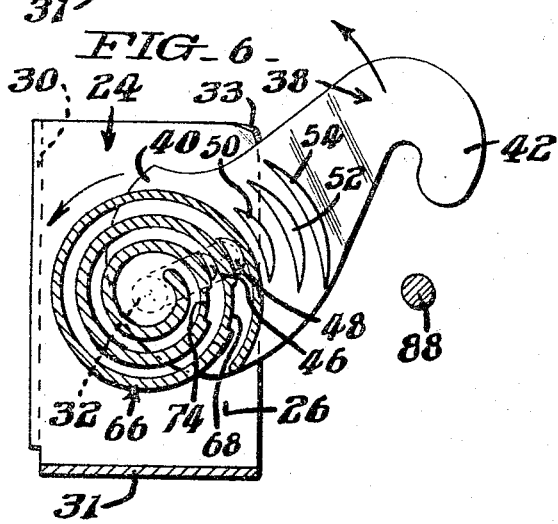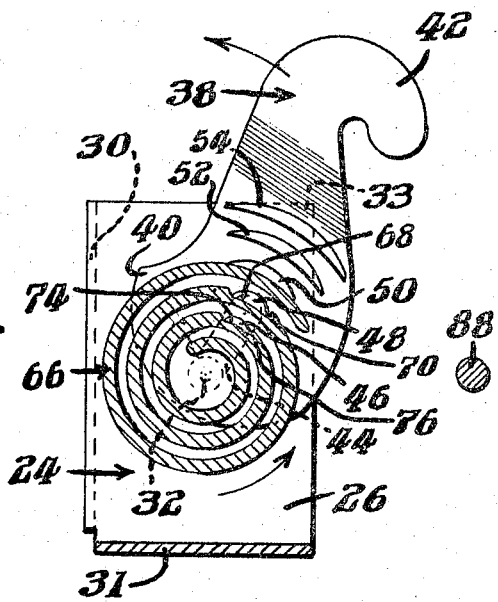

Jan. 23, 1968 R. H. BISBING 3,365,223
BUTT JOINT DRAW FASTENER
Filed Oct. 7, 1965 3 Sheets-Sheet 3
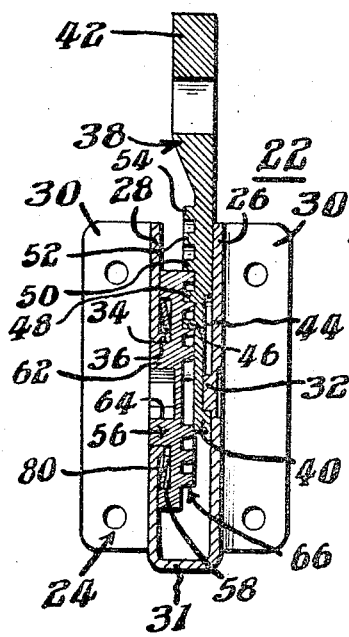
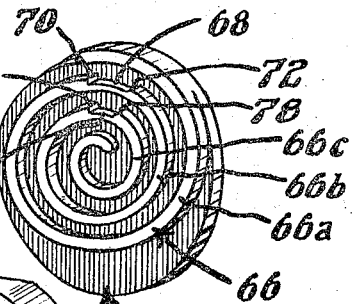
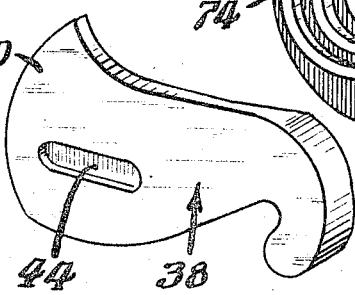
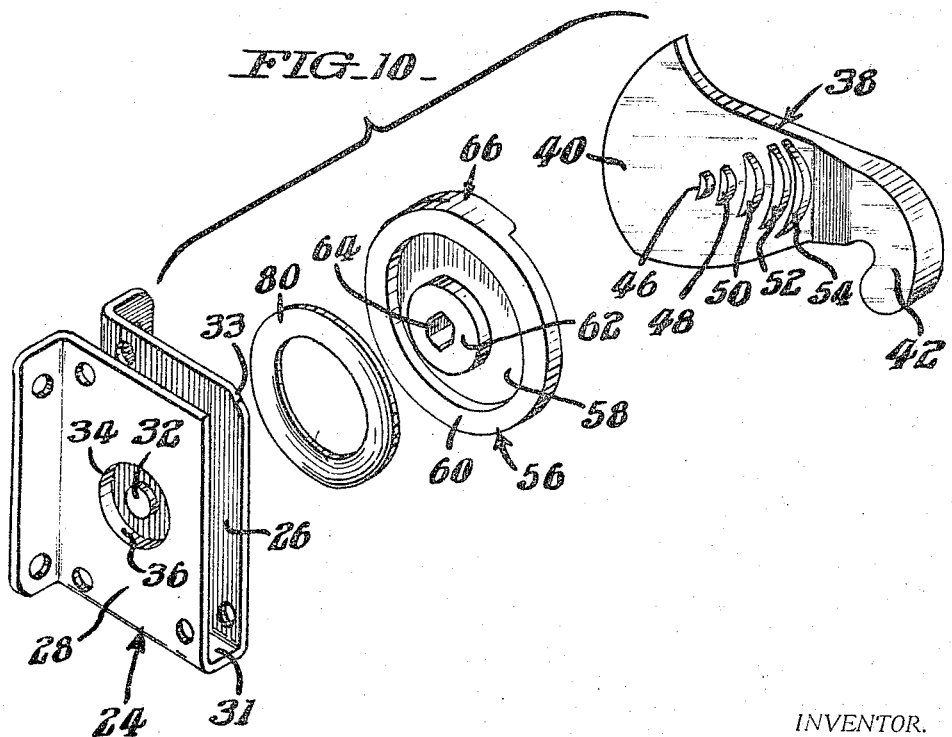
INVENTOR.
Robert H. Bisbing,
BY
Paul & Paul
ATTORNEYS.

United States Patent Office 3,365,223
Patented Jan. 23, 1968

3,365,223
BUTT JOINT DRAW FASTENER
Robert H. Bisbing, Springfield, Pa., assignor to Southco, Inc., a corporation of Delaware
Filed Oct. 7, 1965, Ser. No. 493,661
12 Claims. (Cl. 287—20.924)

ABSTRACT OF THE DISCLOSURE

A butt joint draw fastener is disclosed in which teeth projecting from one side of a driven hook member are internested with the turns of a flat spiral formation projecting from one side of a driving cam member. The hook and cam members are mounted in a frame in which the cam member may be turned, as by a wrench, manually about a fixed axis. The frame is embedded in one of the abutting structural members that are to be fastened together. As the cam member is turned, the hook member is moved into engagement with a pin anchored in the other structural member.

---

This invention relates generally to fasteners and particularly to butt joint fasteners.

A principal object of the invention is to provide an improved fastener for securing together a pair of structural members with opposed surfaces abutting each other.

Another object is to provide such a fastener which is quickly operated to draw the members together and thereafter quickly operated to release them.

Another object is to provide such a fastener operative to hold the members together regardless of the thickness (within limits) of a gasket between them.

Another object is to provide such a fastener which is operative in spite of substantial inaccuracies in mounting the fastener and wide variations in the thickness of the members fastened together.

Another object is to provide such a fastener which is embedded in one of the structural members, and which when fully open does not extend beyond the face of the structural member.

Another object is to provide such a fastener which is rugged and self-locking, and which has high vibration resistance.

Other objects of the invention will become apparent when the following description is read with reference to the accompanying drawings, in which:

FIGURE 1 is a fragmentary perspective view of two structures fastened together by means of a fastener constructed in accordance with the invention;

FIGURES 2 and 3 are sections on lines II—II and III—III in FIGURE 1;

FIGURE 4 is a section on line IV—IV in FIGURE 3, showing the fastener closed;

FIGURES 5, 6, 7 and 8 are sections similar to FIGURE 4. FIGURES 5, 6 and 7 show the fastener in various stages between fully closed and fully open. FIGURE 8 shows the fastener fully open;

FIGURE 9 is a section on line IX—IX in FIGURE 8;

FIGURE 10 is an exploded perspective view of the fastener;

FIGURE 11 is a perspective view of the cam part of the fastener; and

FIGURE 12 is a perspective view of the hook part of the fastener.

The following description is directed to the specific form of the invention shown in the drawings and is not addressed to the scope of the invention, which may be practiced in a variety of forms.

Referring particularly to FIGURES 1–3, the fastener is employed to fasten together a pair of frames, generally designated 10 and 16. The frame 10 comprises members 12 and 14, and the frame 16 comprises members 18 and 20. The fastener is designated 22.

Referring particularly to FIGURES 9 and 10, the fastener is provided with a housing or frame member 24 made of sheet metal. The housing is U-shaped in transverse section, being provided with opposed side walls 26 and 28 connected together by a part 31 and preferably having flanges 30. The side wall 26 is provided with an inwardly projecting boss 32 and a turned in corner or yieldable stop 33. The side wall 28 is provided with an opening 34 bounded by an inwardly projecting flange 36, which is concentric with the boss 32.

Referring particularly to FIGURES 10 and 12, the fastener is provided with a hook member 38 having a flat main body 40. Extending forwardly from the main body 40 is an extension in the form of a hook 42. One side of the hook member 38 is flat. This flat side is provided with a slot 44, which extends longitudinally of the hook member. Formed on the opposite face of the hook member are a series of crescent shaped teeth, respectively designated 46, 48, 50, 52 and 54. The crescent shaped teeth are graduated in size and spaced from one another longitudinally of the hook member, as shown. The large radius arcuate surfaces of the teeth are concentric with the rounded rearward end of the slot 44, and the small radius arcuate surfaces of teeth 48, 50, 52 and 54 are concentric with the rounded forward end of the slot 44. The tooth 46 is disposed rearwardly of the center of curvature of the rounded forward end of the slot 44.

Referring particularly to FIGURES 10 and 11, the fastener is provided with a cam member in the form of a round disc, generally designated 56. One face of the disc is provided with an annular depression 58 bounded by a rim 60 and a central hub 62. The hub is provided with a hexagonal socket 64 for receiving a wrench. The opposite face of the disc is provided with a flat spiral tooth 66 commencing at the periphery of the disc and spiralling inwardly at a uniform rate through an outer turn 66a, an intermediate turn 66b and an inner turn 66c. The tooth is uniform in width, except for the outermost portion of the tooth, which is feathered to a narrower width. The distance between the successive turns 66a, 66b and 66c of the tooth is uniform. Immediately after the outer turn 66a, the tooth is provided with a recess 68 having a radial shoulder 70 at one end and an angular shoulder 72 at the opposite end. Immediately after the intermediate turn 66b, the spiral tooth is provided with a recess 74 having a radial shoulder 76 at one end and an angular shoulder 78 at the opposite end.

Referring particularly to FIGURES 8 and 9, the hook member 38 is in its fully open position with its flat side abutting side 26 of the housing 24, the boss 32 being engaged in the rearward extremity of the slot 44. The cam member 56 is interposed between the hook member 38 and the side 28 of the housing 24. Teeth 46 and 48 of the hook member are seated respectively in the recesses 74 and 68 of spiral tooth 66. Tooth 50 of the hook member is engaged with outer turn 66a of spiral tooth 66. Teeth 52 and 54 are not engaged with the spiral tooth at all. Hub 62 of the cam member is received by the opening 34 in the side 28 of the housing. A spring 80, in the form of a bent annular washer, is nested in depression 58 and presses the cam member 56 against the hook member 38 and the latter against the side 26 of the housing.

Referring particularly to FIGURES 1 to 3, the opposed surfaces of the frame members 12 and 18 are butted together. In this condition, an elongated opening 82, preferably extending through frame member 12, registers with a similarly elongated opening 84 preferably extending through frame member 18. The fastener 22 is nested in the opening 82 in frame member 12. The frame member 12 is recessed to receive flanges 30 of housing 24, the housing being secured by screws 86. Pin 88 is fixed in frame member 18 and extends across the opening 84.

Referring particularly to FIGURES 1 to 4, the housing 24 is embedded in and secured to the frame member 12, as noted hereinbefore. The cam member 56 is anchored to the housing 24 by hub 62 engaged in opening 34. The hook member 38 is anchored to the cam member 56 by its crescent shaped teeth 46 and 48 interengaged with the spiral tooth 66 of the cam member. The cam member has been turned as far as possible clockwise so that the hook 42 is fully engaged with the pin 88. Thus opposed surfaces of the members 12 and 18 are securely butted together.

The average developed length of one turn of the spiral 66 is approximately four inches. In that length, the radius of the spiral increases approximately $3/16$ of an inch. In other words, the spiral is equivalent to an inclined plane rising $3/16$ of an inch in four inches. This is an extremely low angle of inclination, which makes the fastener self-locking in any position. No amount of pull on the hook can cause the cam to rotate, the reason being that the coefficient of friction between the crescent shaped teeth and the spiral tooth far exceeds the tangent of the angle of inclination. The fastener is not only self-locking, but also extremely vibration resistant.

Referring particularly to FIGURE 4, the boss 32 is disposed intermediate the ends of slot 44. To open the fastener a wrench is inserted through an opening 90 in the member 12 and into the hex socket 64 in hub 62 of the cam member. Thereupon the cam is turned approximately 210 degrees counterclockwise from the position of FIGURE 4 to that of FIGURE 5. The spiral tooth 66 cams the teeth 46 and 48 of the hook member 38 (and consequently the hook member 38) forwardly in fastener opening direction toward the pin 88 till the hook 42 is free of the pin and the boss 32 is engaged in the rearward extremity of the slot 44. The cam member is now turned counterclockwise another approximately 45 degrees from the position of FIGURE 5 to that of FIGURE 6. The hook member may turn counterclockwise with the cam, pivoting about the boss 32, as shown in FIGURE 6. When this occurs the housing is sprung slightly fore and aft, and the upper edge of the hook member engages the turned in corner 33 of the housing, whereupon the hook member is arrested. The cam member is now turned counterclockwise a little farther, whereupon teeth 46 and 48 of the hook member seat in recesses 74 and 68 of the spiral tooth 66, releasing the spring in the housing. Now the cam member is turned counterclockwise still farther, whereupon teeth 46 and 48 of the hook member are engaged by radial shoulders 76 and 70 of recesses 74 and 68, and the hook member is moved over and past the turned down corner 33 of the housing (FIGURE 7) to its fully open position shown in FIGURE 8.

To reclose the fastener, the wrench is turned clockwise, whereupon the inclined edges 78 and 72 of the recesses 74 and 68 engage teeth 46 and 48 of the hook member and turn the latter down over and past the turned down corner 33 and into unlocked engagement with the pin. The cam is now turned clockwise farther, whereupon the teeth 46 and 48 are cammed out of recesses 74 and 68 by shoulders 78 and 72 and the housing is again sprung. Further turning of the cam member clockwise releases the spring of the housing. The cam is now turned clockwise until the hook 42 is fully engaged with the pin 88.

It will be noted that the hook member may pivot about and shift cross-axially of the boss 32.

FIGURE 5 shows the extreme forward position of the hook member (before housing is sprung). However, the position of the hook member, when the fastener is closed, depends on the position of the pin, which may be positioned so near the abutting surfaces of the frame members 12 and 18 that the tooth 46 of the hook member is within the innermost turn 66c of the spiral tooth 66. On the other hand, the pin may be positioned still nearer the abutting surfaces of the frame members so that both tooth 46 and tooth 48 are within the innermost turn 66a of spiral tooth 66.

In the former case, the tooth 46 of the hook member is within the innermost turn of the spiral tooth, the tooth 48 is between the innermost and intermediate turns of the spiral tooth, and the tooth 50 is between the intermediate and outermost turns of the spiral tooth. The tooth 52 is adjacent the outer surface of the outermost turn of the spiral tooth, while the tooth 54 is not engaged with the spiral tooth at all.

In the latter case, the tooth 46 of the hook member is not engaged with the spiral tooth at all. The tooth 48 is within the innermost turn of the spiral tooth. The tooth 50 is between the innermost and intermediate turns of the spiral tooth, and the tooth 52 is between the intermediate and outermost turns of the spiral tooth. The tooth 54 is adjacent the outermost turn of the spiral tooth. Thus, gaskets of various thicknesses and substantial inaccuracies in locating the pin in the frame member 18 can be tolerated.

It is preferable to provide the spiral tooth 66 with the recesses 68 and 74 and the wall 26 with the turned in corner 33, and it is also preferable to furnish the fastener with the spring 80. However, I do not intend to be limited to a fastener including these features because when the fastener is to be used for certain purposes any or all of these features may be omitted without impairing the usefulness of the fastener.

What is claimed is:

1. In a fastener for securing together structural members disposed in face-to-face abutting relation, the combination comprising frame means providing laterally spaced wall areas, a first member disposed between said wall areas and including a generally flat main body part mounted upon one of said wall areas for being rotated freely about a fixed axis, and tooth means extending from the side of said main body part remote from said one wall area, a second member having a generally flat main body part disposed between said first member and the other of said wall areas, a forward extension of said main body part of said second member arranged as a hook for engaging means for holding the same, and tooth means extending from the side of said main body part of said second member remote from said other wall area, the tooth means of one of said first and second members being in the form of a flat spiral, and the tooth means on the other of said members being in the form of a plurality of spaced teeth projecting toward said one member and having arcuate side surfaces adapted to cooperate with the spiral configuration of the tooth means on said one member for providing a camming action therebetween, the teeth of said first and second members being interlocked radially for securing said second member against being pulled from between said wall areas of said frame means, said first and second members being nested between said wall areas for securing said teeth against disengagement, and said first member being operable for moving said second member in fastener opening direction and for retracting the same in fastener closing direction, and coacting means on said second member and on said other wall area for guiding said second member when the fastener is being opened or closed.

2. The combination according to claim 1 wherein the frame means is a substantially rigid sheet metal member of U-shape in transverse section and the first and second members are nested between the opposed legs of said U-shaped frame member.

3. The combination according to claim 1 wherein the first member is provided with a central hub part rotatably received by an opening formed in the one wall area.

4. The combination according to claim 3 wherein the hub part is provided with a socket for receiving a wrench for turning the first member.

5. The combination according to claim 1 wherein said coacting means comprise a slot in said second member extending longitudinally thereof and a boss on the other wall area extending into said slot, whereby said second member is thereby mounted for pivotal movement about said boss and for shifting movement cross-axially thereof.

6. The combination according to claim 1 wherein the first member bears the flat spiral tooth, the spiral tooth has a plurality of turns, and the radial spacing between successive turns is uniform.

7. The combination according to claim 6 wherein the tooth means on the second member are located on longitudinally spaced areas of the second member wherein each tooth is freely slidable in the space between the turns on the flat spiral tooth of the first member.

8. The combination according to claim 6 wherein the other wall area is provided with means providing a yieldable stop for arresting the second member when the fastener is opened, means is provided at a selected angular position on the spiral tooth of the first member for interlocking angularly with at least one tooth of the second member when the second member engages said stop, and said first member is operable, when interlocked angularly with said second member, for moving the latter past said stop to its fully opened position.

9. The combination according to claim 8 wherein the teeth of the second member are graduated in size, being larger toward the forward hook extension and wherein the angular interlocking means on the spiral tooth is an arcuate recess provided in the outer surface of at least one turn of the spiral tooth of the first member, forming shoulders at each end of said recess, and said recess is of a length to receive only a predetermined tooth of the second member, whereby the first and second members are angularly interlocked.

10. The combination according to claim 9 wherein at each recess the one shoulder is at such an inclined angle that, when the first member is moved angularly in fastener closing direction, the shoulder is operative to move the second member past the stop, but when the second member is held fast against further angular movement, the tooth nested in the recess is cammed up said inclined one shoulder and out of the recess.

11. The combination according to claim 1 wherein spring means interposed between the one wall and the first member is operative to press the first and second members together and the second member against the other of the walls.

12. In a fastener for securing together structural members disposed in face-to-face abutting relation, the combination comprising a substantially rigid sheet metal frame member of U-shape in transverse section, a cam member having a flat main body part provided with a tooth extending from one side thereof and in the form of a flat spiral of several turns, a hook member having a flat main body part, a forward extension of said main body part in the form of a hook, a slot in one side of said main body part extending longitudinally thereof, and longitudinally spaced areas bearing crescent-shaped teeth graded in size and each freely slidable between successive turns of said spiral, a spring member, said cam, hook and spring members being internested between the opposed walls of said frame member with the teeth of said cam and hook members interengaged and with said spring member interposed between said cam member and one of said walls for urging said cam and hook members together and against the other of said walls, a hub on said cam member projected in an opening in said one wall for rotation therein about a fixed axis, a socket in said hub for receiving a wrench for turning said cam member, a boss on the other of said walls projecting into the slot formed in said hook member and about which said hook member may pivot when it is actuated by said cam member, a stop in said frame member for yieldably engaging said hook member when the latter is in an intermediate position between closed and opened position, and means on said spiral tooth for detachably interlocking said cam and hook members when the latter is in said intermediate position so that the cam member is operable for moving the hook member in either direction past said stop.

References Cited

UNITED STATES PATENTS

| | | | |
|---|---|---|---|
| 792,185 | 6/1905 | Weldon | 292—65 |
| 3,191,244 | 6/1965 | Burke | 292—111 |

CARL W. TOMLIN, *Primary Examiner.*

R. S. BRITTS, *Assistant Examiner.*